US007681899B2

(12) United States Patent
Fujiwara

(10) Patent No.: US 7,681,899 B2
(45) Date of Patent: Mar. 23, 2010

(54) BICYCLE SADDLE LIFTER

(75) Inventor: Hisao Fujiwara, Izumi (JP)

(73) Assignee: Fujiwara Wheel Incorporated, Osaka (JP)

( * ) Notice: Subject to any disclaimer, the term of this patent is extended or adjusted under 35 U.S.C. 154(b) by 0 days.

(21) Appl. No.: 12/227,490

(22) PCT Filed: Mar. 13, 2007

(86) PCT No.: PCT/JP2007/054940

§ 371 (c)(1),
(2), (4) Date: Dec. 1, 2008

(87) PCT Pub. No.: WO2007/141946

PCT Pub. Date: Dec. 13, 2007

(65) Prior Publication Data

US 2009/0166997 A1 Jul. 2, 2009

(30) Foreign Application Priority Data

Jun. 2, 2006 (JP) ............................ 2006-154498
Sep. 12, 2006 (JP) ............................ 2006-246574
Sep. 14, 2006 (JP) ............................ 2006-249568

(51) Int. Cl.
*B62K 3/00* (2006.01)

(52) U.S. Cl. ............... 280/283; 280/288.4; 297/215.13; 297/195.1

(58) Field of Classification Search ................. 280/283, 280/288.4, 220; 297/215.13, 195.1
See application file for complete search history.

(56) References Cited

U.S. PATENT DOCUMENTS 5,702,093 A * 12/1997 Liao .......................... 267/132

(Continued)

FOREIGN PATENT DOCUMENTS

JP 2006-027497 2/2006

(Continued)

OTHER PUBLICATIONS

International Search Report issued Apr. 17, 2007 in the International (PCT) Application of which the present application is the U.S. National Stage.

*Primary Examiner*—Lesley D Morris
*Assistant Examiner*—Tashiana Adams
(74) *Attorney, Agent, or Firm*—Wenderoth, Lind & Ponack, L.L.P.

(57) ABSTRACT

A bicycle saddle lifter is provided which is safe and simple in structure and which can raise the saddle of a bicycle while a bicycle driver is sitting on the saddle. The biasing force of a stroke spring 10 which biases the saddle upwardly is determined such that when the weight of a bicycle driver directly acts on the saddle, the saddle lowers, and when the driver applies force to pedals of the bicycle while sitting on the saddle, and the load on the saddle decreases, the saddle rises. While the driver is not sitting on the saddle, resistance resulting from the biasing force of the stroke spring prevents a ratchet pawl 13*b* for checking the ascent of the saddle from being disengaged from the corresponding ratchet gear 14 even by switchover operation. While the driver is sitting on the saddle, the biasing force of the stroke spring 10 is canceled by the load applied to the saddle and the resistance decreases, thereby allowing the ratchet pawl 13*b* for checking the ascent of the saddle to be disengaged from the ratchet gear 14 by switchover operation.

4 Claims, 5 Drawing Sheets

U.S. PATENT DOCUMENTS

| | | | | |
|---|---|---|---|---|
| 6,270,065 | B1 * | 8/2001 | Hals | 267/132 |
| 6,409,130 | B1 * | 6/2002 | Maret | 248/219.2 |
| 7,144,029 | B1 * | 12/2006 | Heady | 280/288.4 |
| 7,392,967 | B2 * | 7/2008 | Liaw et al. | 248/218.4 |
| 2002/0185581 | A1 * | 12/2002 | Trask | 248/408 |

FOREIGN PATENT DOCUMENTS

| | | |
|---|---|---|
| JP | 2006-056285 | 3/2006 |
| JP | 2006-123882 | 5/2006 |
| JP | 2006-193128 | 7/2006 |

* cited by examiner

BICYCLE SADDLE LIFTER

TECHNICAL FIELD

This invention relates to a device that can raise and lower the saddle of a bicycle while a bicycle rider is driving the bicycle so that he or she can easily apply force to the pedals during traveling, and can easily put a foot on the ground when the bicycle comes to a stop.

BACKGROUND ART

Ordinarily, a bicycle saddle is mounted on the top end of a saddle post slidably inserted in a vertical pipe of the frame of a bicycle. By fixing the saddle post to the vertical pipe with a clamp, the saddle can be locked in position at a desired height.

During traveling, the saddle is preferably at a higher position so that the rider can more easily apply force to the pedals. When the bicycle comes to a stop, the saddle is preferably at a lower position so that the rider can more easily and safely put a foot on the ground. But conventional height adjustment mechanisms as described above do not allow height adjustment of the saddle during traveling.

Many devices have therefore been proposed which can raise and lower the saddle during traveling. A typical such device includes a spring that biases the saddle upwardly, and a shock absorber for curbing a sharp rise and lowering of the saddle. By operating a switchover member on the handlebar, the saddle can be selectively locked at any height and moved.

The present applicant also proposed a bicycle saddle lifter in Patent document 1, which comprises a shock absorber having a cylinder as a fixed pipe inserted in a vertical pipe of a bicycle, and a piston as a lifting rod carrying a saddle on top thereof, a link coupling the fixed pipe to the lifting rod, and a stroke spring that biases the saddle upwardly.

In one embodiment, this device further includes ratchet pawls for checking descent and ascent of the saddle, respectively, and corresponding ratchet gears, wherein the ratchet pawls and the ratchet gears are mounted at a portion where upper and lower link pieces forming the link are coupled together.

In this device, when the switchover member on the handlebar is operated, the respective ratchet pawls are selectively brought into or out of engagement with the corresponding ratchet gears for switchover between a state where the saddle is allowed only to ascend and prevented from descending from a locked position at a predetermined height and a state where the saddle is allowed only to descend and prevented from ascending from a locked position at a predetermined height.

In order to ensure reliable switchover between the above two states and reliable engagement, the tips of the respective ratchet pawls and the valleys of the respective ratchet gears both have an angle of 90°.

Patent document 1: JP Patent Publication 2006-27497A

DISCLOSURE OF THE INVENTION

Object of the Invention

In this bicycle saddle lifter, by operating the switchover member to disengage the ratchet pawl for checking the descent of the saddle from the corresponding ratchet gear immediately before the bicycle comes to a stop, the saddle is allowed to descend under the body weight of the rider.

On the other hand, after starting the bicycle, when the rider operates the switchover member to disengage the ratchet pawl for checking the ascent of the saddle from the corresponding ratchet gear and simultaneously bring the ratchet pawl for checking the descent of the saddle into engagement with the corresponding ratchet gear, and then stands on the pedals so as to be separated from the saddle, the saddle rises under the biasing force of the stroke spring and is fixed in position at a predetermined height.

But immediately after the start, since the bicycle speed is low, it is difficult to control the handlebar while standing on the pedals in a balanced manner, so that the bicycle may fall.

Because a shock absorber is used, this lifter is complicated in structure and thus costly.

An object of this invention is therefore to provide a bicycle saddle lifter which is simple in structure and makes it possible to safely raise the saddle without the need for the rider to stand on the pedals.

Means to Achieve the Object

In order to achieve this object, the present invention provides a bicycle saddle lifter wherein the biasing force of the stroke spring is determined such that when the weight of a bicycle driver directly acts on the saddle, the saddle lowers, and when the driver applies force to pedals of the bicycle while sitting on the saddle, and the load on the saddle decreases, the saddle rises.

While the driver is not sitting on the saddle, resistance resulting from the biasing force of the stroke spring prevents the ratchet pawl for checking the ascent of the saddle from being disengaged from the corresponding ratchet gear even by switchover operation. This prevents inadvertent rise of the saddle.

While the driver is sitting on the saddle, the biasing force of the stroke spring is canceled by the load applied to the saddle and the resistance decreases, thereby allowing the ratchet pawl for checking the ascent of the saddle to be disengaged from the ratchet gear (14) by switchover operation. In this state, simply by applying force to the pedals while sitting on the saddle, the saddle rises.

In a preferred arrangement, the stroke spring is a torsion coil spring, and the biasing force of the stroke spring which vertically upwardly biases the saddle is adjustable by tightening or loosening the stroke spring. With this arrangement, it is possible to expand the body weight range of the rider which the lifter according to the invention can cope with.

In another preferred arrangement, a play is present between coupling portions of the lower link piece and the upper link piece which allows vertical movement of the saddle within a predetermined range while the saddle is locked in position, and the saddle lifter further comprises a cushion spring which biases the link pieces in a direction to eliminate the play, thereby imparting cushioning properties to the saddle, and improving the ride quality.

ADVANTAGES OF THE INVENTION

With the bicycle saddle lifter according to the present invention, after starting the bicycle, when the rider operates the switchover member on the handlebar to disengage the ratchet pawl for checking the ascent of the saddle from the corresponding ratchet gear and then simply applies force to the pedals while sitting on the saddle, the saddle rises. Because it is not necessary to completely stand on the pedals to raise the saddle, the rider can balance the bicycle more easily and thus can drive it more safely.

Because the saddle lifter according to this invention needs no shock absorber, it can be manufactured at a lower cost and is less likely to malfunction.

DESCRIPTION OF THE NUMERALS

Figure 1:
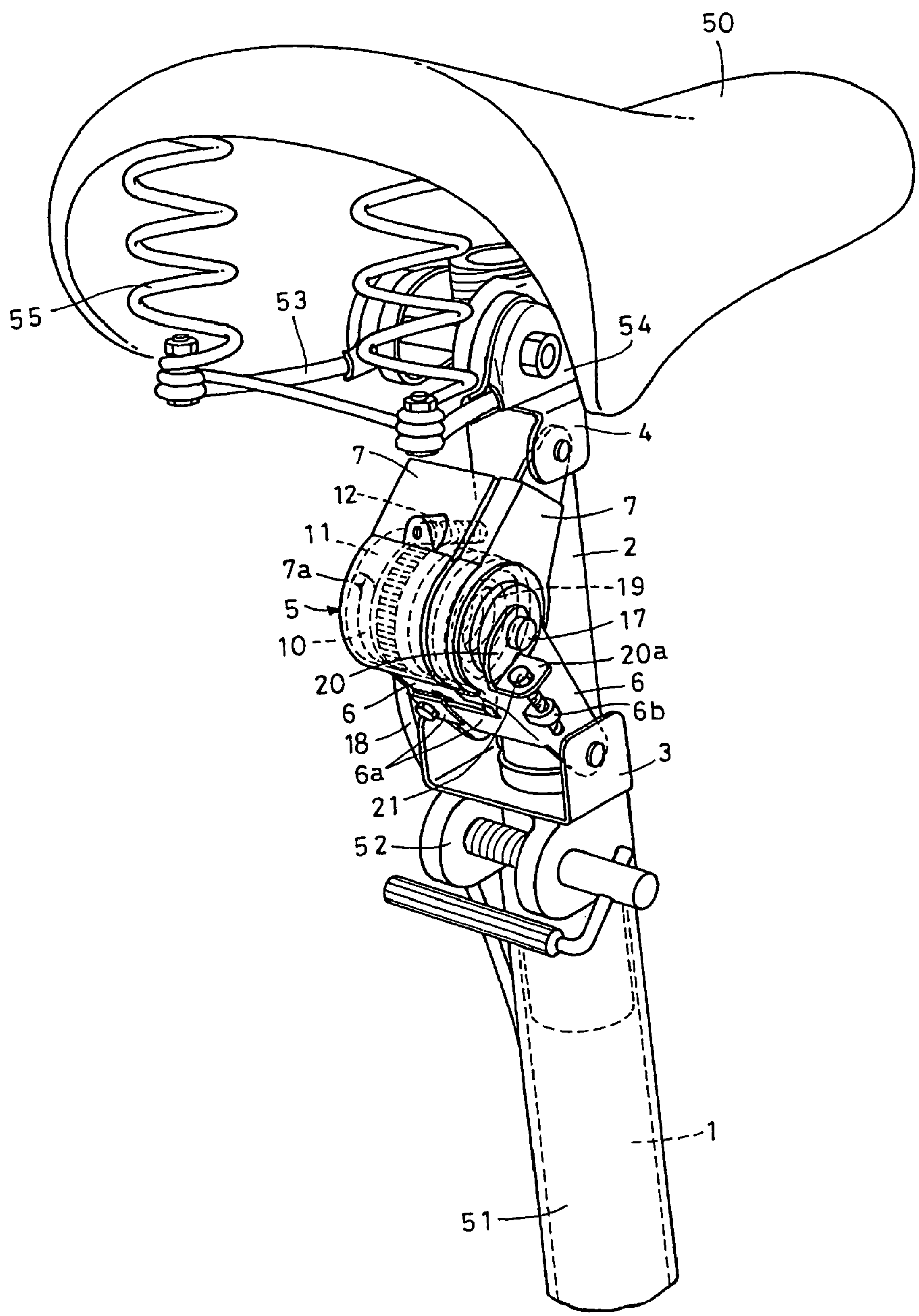
FIG. 1 is a perspective view of a bicycle saddle lifter embodying the present invention.
Figure 2:
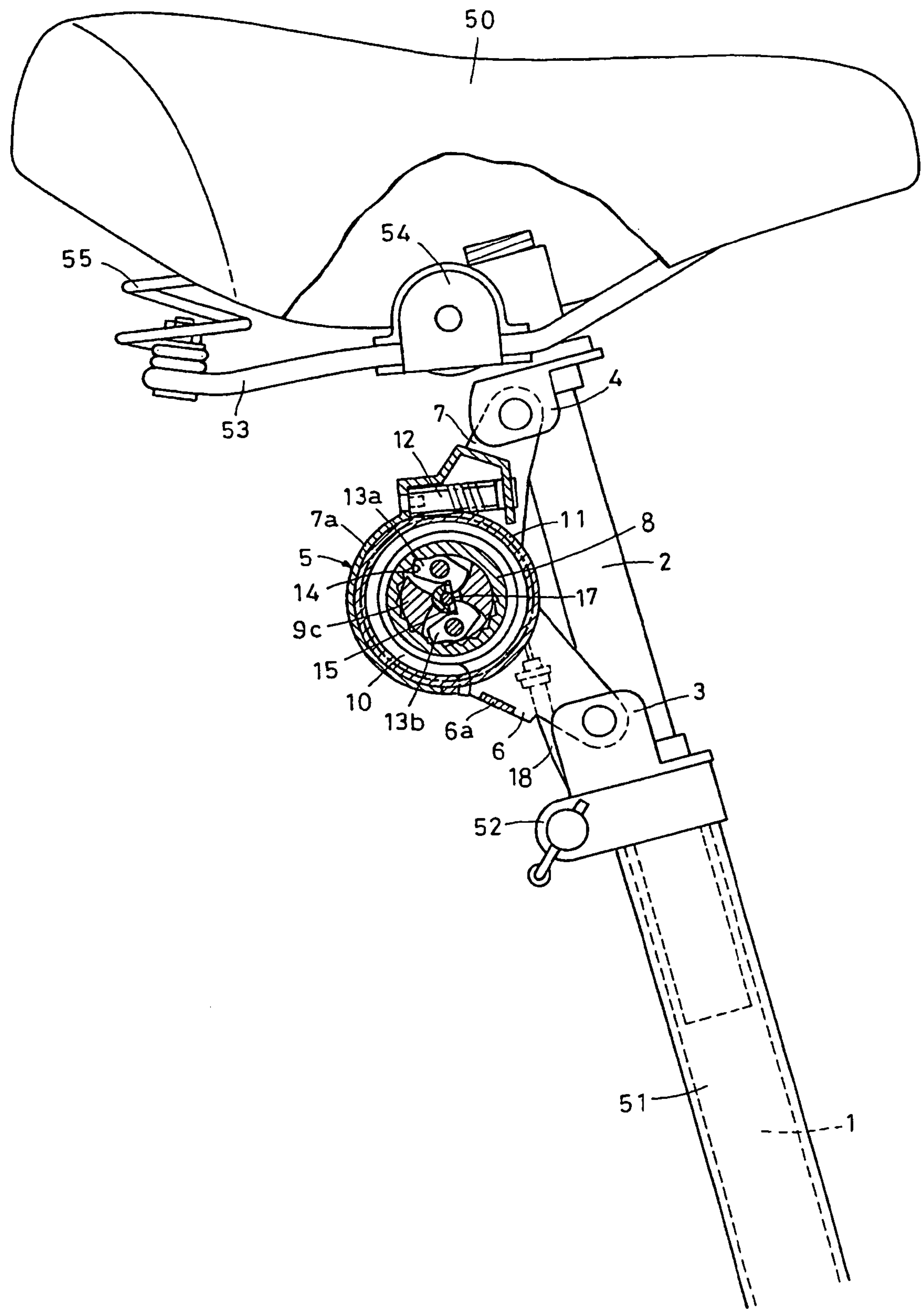
FIG. 2 is a partially cutaway right-hand side view of the saddle lifter of FIG. 1, showing the saddle in its raised position.
Figure 3:
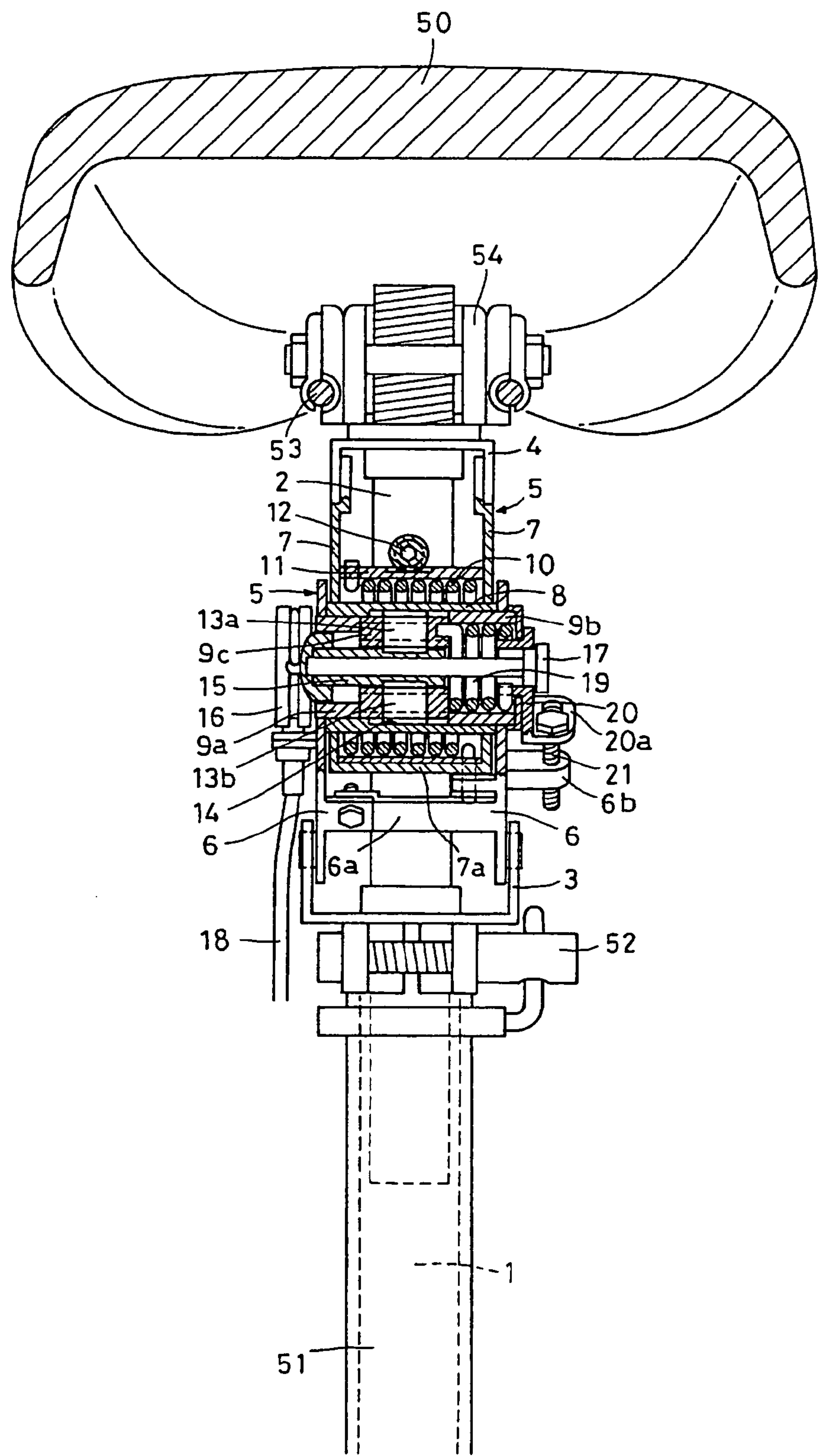
FIG. 3 is a partially cutaway rear view of the saddle lifer of FIG. 1.
Figure 4:
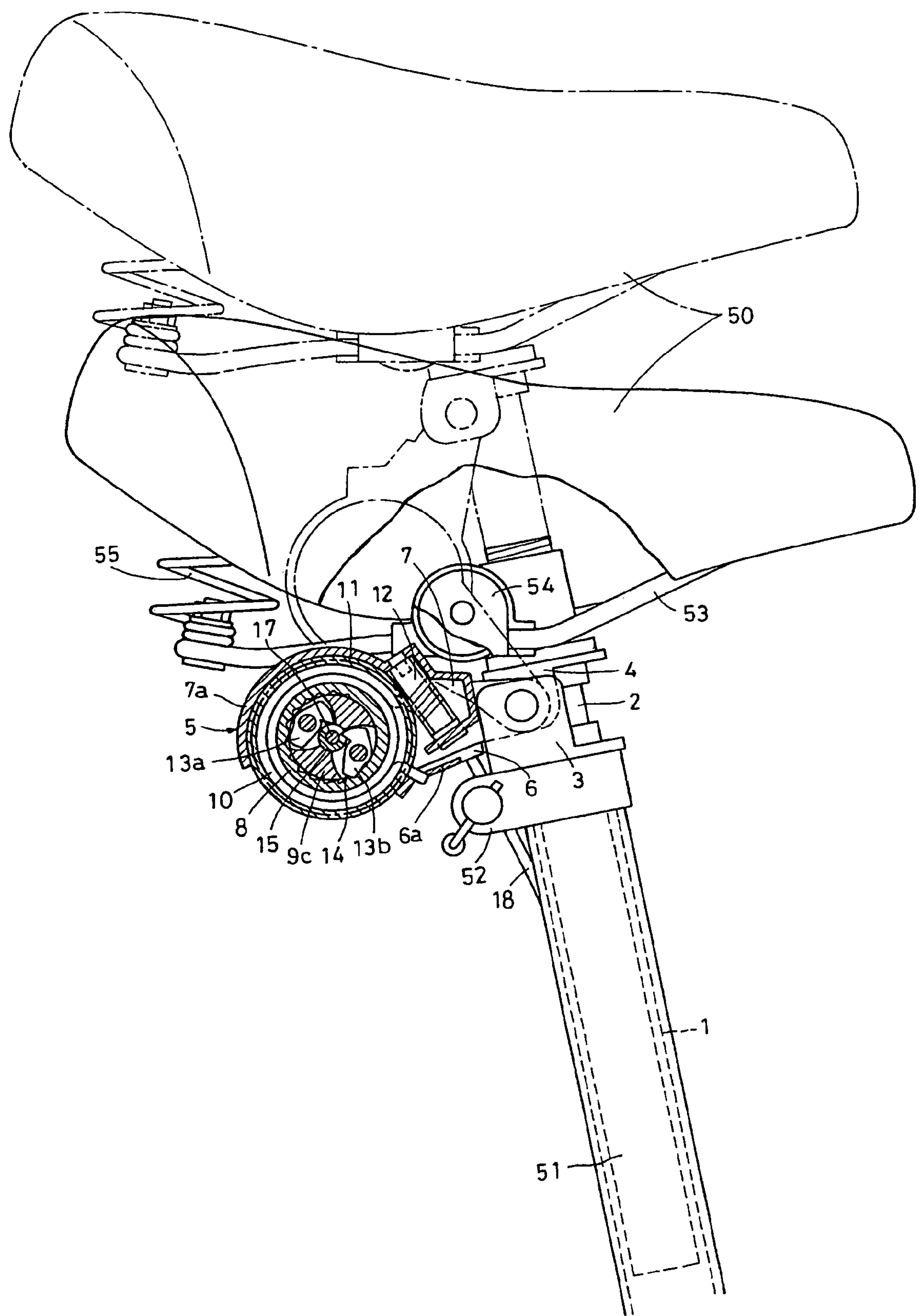
FIG. 4 is a partially cutaway right-hand side view of the saddle lifter of FIG. 1, showing the saddle in its lowered position.

1. Fixed pipe
2. Lifting rod
3. Lower support
4. Upper support
5. Link
6. Lower link piece
6*a*. Coupling piece
6*b*. Protrusion
7. Upper link piece
7*a*. Cover portion
8, 9*a*, 9*b*, 9*c*. Boss
10. Stroke spring
11. Adjusting tube
12. Adjusting bolt
13*a*. Ratchet pawl for checking the descent of the saddle
13*b*. Ratchet pawl for checking the ascent of the saddle
14. Ratchet gear
15. Switchover tube
16. Wire drum
17. Clamp bolt
18. Wire
19. Cushion spring
20. Adjusting member
20*a*. Protrusion
21. Adjusting bolt
50. Saddle
51. Vertical pipe
52. Clamp
53. Saddle frame
54. Holder
55. Saddle cushion spring

BEST MODE FOR EMBODYING THE INVENTION

The embodiment of this invention is now described with reference to the drawings.

The saddle lifter of this embodiment is a general-purpose one that can be mounted on any ordinary bicycle. As shown in FIGS. 1 to 4, through the saddle lifter, a saddle 50 is vertically movably supported over a vertical pipe 51 of the bicycle. The saddle lifter includes a fixed pipe 1, which is provided instead of the existing saddle post. The fixed pipe 1 is inserted in the vertical pipe 51 and fixed in position by a clamp 52. A lifting rod 2 is slidably inserted in the vertical pipe 51. The saddle 50 is mounted on top of the lifting rod 2 by means of a holder 54 fixed to a saddle frame 53.

A lower support 3 is mounted on top of the fixed pipe 1, and an upper support 4 is mounted on top of the lifting rod 2. The lower and upper supports 3 and 4 are coupled together through a pair of left and right links 5. The links 5 each comprise lower and upper link pieces 6 and 7 which open and close as the lifting rod 2 slides, thereby raising and lowering the saddle 50.

The upper link pieces 7 of the respective links 5 have their proximal ends fixed to a large-diameter boss 8, while the lower link pieces 6 of the respective links 5 have their proximal ends fixed to right and left small-diameter bosses 9*a* and 9*b*. A small-diameter boss 9*c* is disposed between the bosses 9*a* and 9*b* so as to be rotatable relative to the bosses 9*a* and 9*b* within a predetermined angular range. The bosses 9*a*, 9*b* and 9*c* are received in the boss 8 so as to be rotatable relative to the boss 8.

Around the boss 8, a stroke spring 10 in the form of a torsion coil spring is mounted which biases the saddle 50 vertically upwardly. An adjusting tube 11 is fitted around the spring 10. The stroke spring 10 has one end thereof in engagement with the adjusting tube 11 and the other end in engagement with one of the lower link pieces 6. The lower link pieces 6 of the respective links are coupled together through a coupling piece 6*a* that extends in the widthwise direction.

The biasing force of the stroke spring 10 is set to a sufficiently large value so that the saddle 50 rises the moment the rider applies a force to the pedals without completely standing on the pedals. For example, in the case of a ladies bicycle, the biasing force of the stroke spring 10 is set to about 40 kgf, which is slightly smaller than the average body weight of women.

One of the upper link pieces 7 has a cover portion 7*a* which covers the adjusting tube 11. The cover portion 7*a* carries at its upper portion an adjusting bolt 12. By inserting a tool such as a wrench into a hole formed through the cover portion 7*a* and turning the adjusting bolt 12, the adjusting tube 11 turns relative to the upper link pieces 7, thereby tightening or loosening the stroke spring 10. Thus, by turning the adjusting bolt 12, it is possible to adjust the biasing force of the spring 10, which biases the saddle 50 upward.

The boss 9*c*, which is provided at the portion where the lower link pieces 6 are coupled to the upper link pieces 7, has cavities in which ratchet pawls 13*a* and 13*b* for checking descent and ascent of the saddle, respectively, are received. The ratchet paws 13*a* and 13*b* serve as a switchover mechanism for switchover between ascending and descending of the saddle. First and second ratchet gears 14 that are opposite in direction to each other are formed on the inner periphery of the boss 8. The ratchet pawls 13*a* and 13*b* are spring-biased such that one end of each ratchet pawl protrudes radially outwardly.

A switchover tube 15 that serves as a cam is inserted in the boss 9*c*. A wire drum 16 is rotationally fixed to one end of the switchover tube 15. The head of a clamp bolt 17 is in abutment with the other end of the switchover tube 15. The clamp bolt 17 has a threaded portion which is in threaded engagement with the wire drum 16.

A wire 18 extends from an operation lever for raising and lowering the saddle which is mounted to the handlebar to the wire drum 16. The wire 18 is wound around the wire drum 16 by being received in a groove formed in the outer periphery of the wire drum 16. The switchover tube 15 is biased by a switchover spring disposed between itself and the boss 9*c* to its home position.

Figure 5:
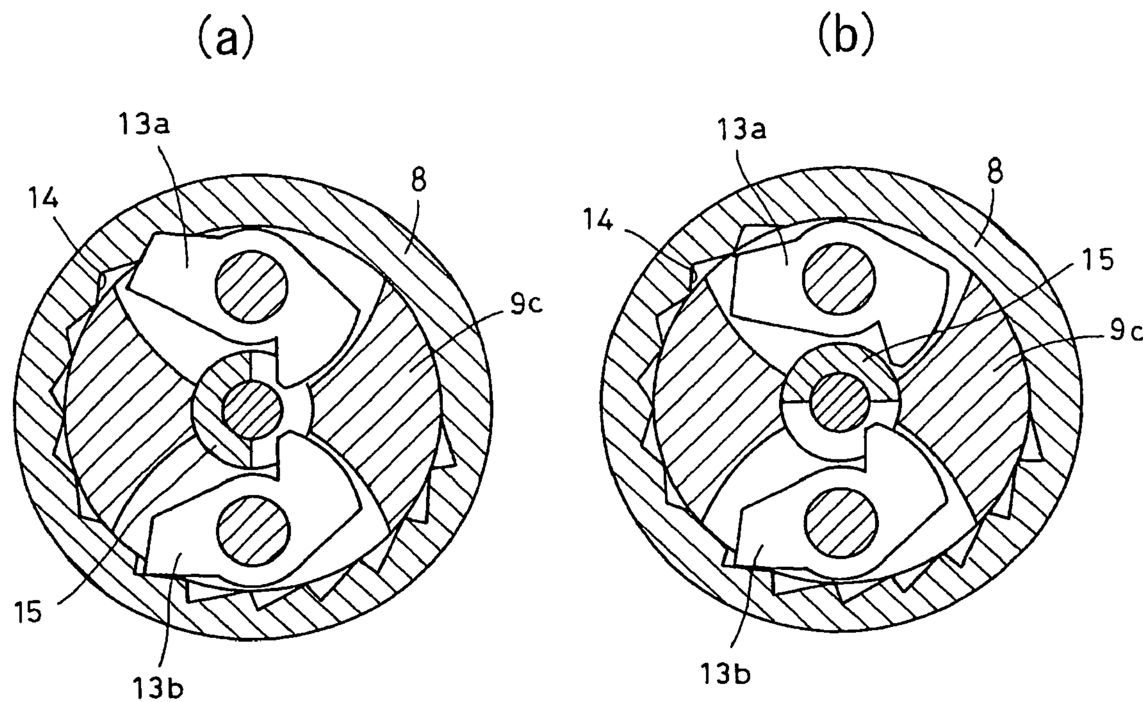
FIG. 5(*a*) is a sectional view of a switchover mechanism, showing its position where the saddle is locked at its uppermost end, and FIG. 5(*b*) is a sectional view of the switchover mechanism, showing its position where the saddle can only be lowered and is prevented from rising.

In this switchover mechanism, as shown in FIG. 5(*a*), when the saddle is locked in position at its uppermost end with the ratchet pawls 13*a* and 13*b* for checking descent and ascent of the saddle in engagement with the respective ratchet gears 14, a slight play is present between each of the ratchet pawls 13*a* and 13*b* and the corresponding ratchet gear 14 for smooth switchover.

In this state, when the switchover tube 15 is turned in one direction as shown in FIG. 5(*b*), the ratchet pawl 13*a* for checking the descent of the saddle disengages from the corresponding ratchet gear 14, thus allowing only descent of the saddle while checking its ascent. In this state, because the ratchet pawl 13*b* for checking the ascent of the saddle slides on the corresponding ratchet gear 14, it never hinders the descent of the saddle.

Figure 6:
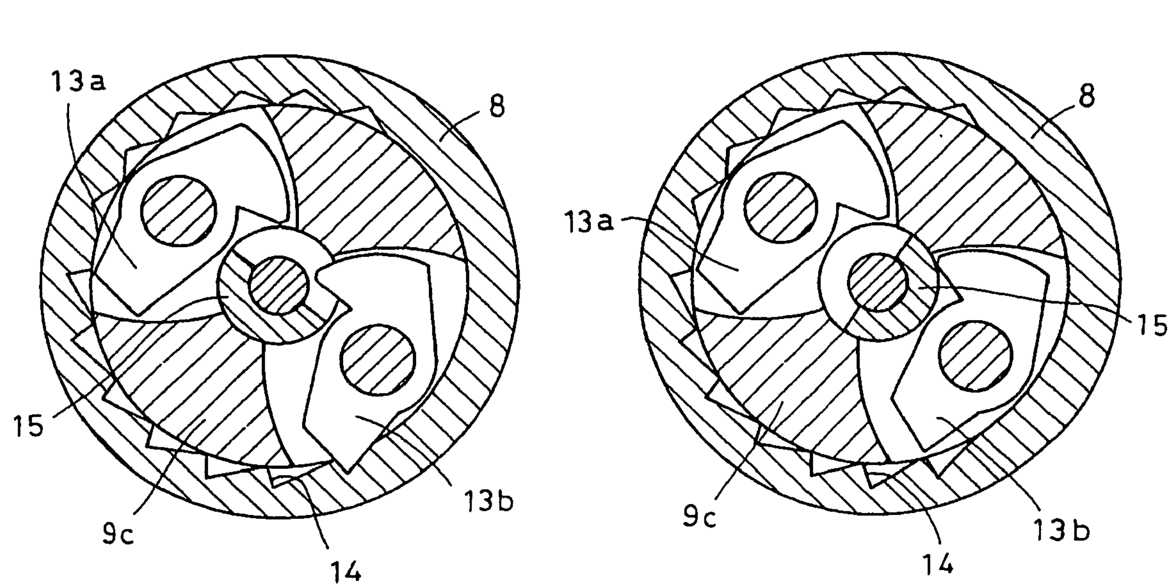
FIG. 6(*a*) is a sectional view of the switchover mechanism, showing its position where the saddle is locked at its lowermost end, and FIG. 6(*b*) is a sectional view of the switchover mechanism, showing its position where the saddle can only be raised and cannot be lowered.

In the state of FIG. 6(*a*), in which the saddle is locked in position at its lowermost end by the ratchet pawl 13*b* for checking the ascent of the saddle, when the switchover tube 15 is turned in the other direction as shown in FIG. 6(*b*), the ratchet pawl 13*b* disengages from the corresponding ratchet gear 14, thus allowing only ascent of the saddle while checking its descent.

In this state, although the ratchet pawl 13*a* for checking the descent of the saddle is pushed by the inner surface of the boss 8 such that its one end protrudes radially outwardly due to the predetermined numbers of the teeth of the gears 14, since the ratchet pawl 13*a* slides on the surface of the ratchet gear 14, the ratchet pawl 13*a* never hinders the ascent of the saddle.

These are the basic functions of the switchover mechanism for switching over descent and ascent of the saddle. In this mechanism, the ratchet pawl 13*b* for checking the ascent of the saddle and the valleys of the corresponding ratchet gear 14 both have an angle smaller than 90°. With this arrangement, while a bicycle driver is not sitting on the saddle 50, even if the operation lever is operated, the ratchet gear 13*b* cannot be disengaged from the ratchet gear 14 due to resistance resulting from the biasing force of the stroke spring 10. This prevents inadvertent rise of the saddle 50.

While a bicycle driver is sitting on the saddle 50, because the biasing force of the stroke spring 10 is canceled by the load of the driver applied to the saddle 50, the above resistance decreases, so that the ratchet pawl 13*b* for checking the ascent of the saddle can be disengaged from the ratchet gear 14 by operating the operation lever. In this state, when the rider simply applies force to the pedals while sitting on the saddle 50, the load on the saddle 50 decreases and the saddle 50 rises.

Even if the tip of the ratchet pawl 13*b* and the valleys of the ratchet gear 14 have angles larger than 90°, the above functions can be achieved if the tip of the ratchet pawl 13*b* and the valleys of the ratchet gear 14 are rounded with a suitable radius of curvature.

On the other hand, the tip of the ratchet pawl 13*a* for checking the descent of the saddle and the valleys of the corresponding ratchet gear 14 both have an angle of 90° or larger. With this arrangement, with a bicycle driver sitting on the saddle 50, the ratchet pawl 13*a* can be easily disengaged from the ratchet gear 14 by operating the operating lever, thereby lowering the saddle 50, which has been raised.

At the portion where the lower link pieces 6 are coupled to the upper link pieces 7, a cushioning mechanism for the saddle 50 is provided. The cushioning mechanism comprises a shaft protruding from the boss 9*a* and received in a circumferential groove formed in the boss 9*c* with a play present therebetween which allows vertical movement of the saddle 50 even while the saddle is locked in position, and a cushion spring 19 biasing the boss 9*c* in a direction to eliminate the play.

The cushion spring 19 has one end thereof coupled to the boss 9*c* and the other end to an adjusting member 20 pivotally mounted to the base of one of the lower link pieces 6. An adjusting bolt 21 extends through an elongated hole formed in a protrusion 20*a* of the adjusting member 20. The adjusting bolt 21 has its threaded portion in threaded engagement with a threaded hole formed in a protrusion 6*b* of the lower link piece 6. By turning the adjusting bolt 21, the cushion spring 19 is tightened or loosened, so that it is possible to adjust the cushioning strength.

By providing the cushioning mechanism, due to the synergetic effect of this mechanism and s saddle cushion spring 55 provided at the rear of the saddle 50, it is possible to impart cushioning properties to the entire saddle 50, thereby markedly improving ride quality such as when the bicycle runs over steps.

What is claimed is:

1. A bicycle saddle lifter comprising a fixed pipe (1) inserted in and fixed to a vertical pipe of a bicycle, a lifting rod (2) carrying a saddle on its top and slidably inserted in said fixed pipe (1), thereby allowing the saddle to be raised and lowered while a bicycle driver is sitting on the saddle, a link (5) through which said fixed pipe (1) and said lifting rod (2) are coupled together, a stroke spring (10) vertically upwardly biasing the lifting rod, said link (5) comprising a lower link piece (6) and an upper link piece (7), ratchet pawls (13*a* and 13*b*) for checking descent and ascent of the saddle, respectively, and corresponding ratchet gears (14), said ratchet pawls and said ratchet gears being provided at a portion where said upper and lower link pieces are coupled together, and being arranged such that the ratchet pawls (13*a* and 13*b*) are selectively brought into and out of engagement with the respective ratchet gears (14), so that the saddle lifter can be selectively switched over between a position where the saddle is allowed to descend and cannot ascend and a position where the saddle is allowed to ascend and cannot descend from its locked positions at predetermined heights, characterized in that the biasing force of the stroke spring (10) is determined such that when the weight of a bicycle driver directly acts on the saddle, the saddle lowers, and when the bicycle driver applies force to pedals of the bicycle while sitting on the saddle, and the load on the saddle decreases, the saddle rises, that while the bicycle driver is not sitting on the saddle, resistance resulting from the biasing force of the stroke spring (10) prevents the ratchet pawl (13*b*) for checking the ascent of the saddle from being disengaged from the corresponding ratchet gear (14) even by switchover operation, and that while the bicycle driver is sitting on the saddle, the biasing force of the stroke spring (10) is canceled by the load applied to the saddle and the resistance decreases, thereby allowing the ratchet pawl (13*b*) for checking the ascent of the saddle to be disengaged from the ratchet gear (14) by switchover operation.

2. The bicycle saddle lifter of claim 1 wherein said stroke spring (10) is a torsion coil spring, and the biasing force of the stroke spring (10) which vertically upwardly biases the saddle is adjustable by tightening or loosening the stroke spring (10).

3. The bicycle saddle lifter of claim 1 or 2 wherein play is present between coupling portions of the lower link piece (6)

and the upper link piece (7) which allows vertical movement of the saddle within a predetermined range while the saddle is locked in position, and wherein the saddle lifter further comprises a cushion spring (19) which biases the link pieces in a direction to eliminate said play, thereby imparting cushioning properties to the saddle.

4. The bicycle saddle lifter of claim 2 wherein play is present between coupling portions of the lower link piece (6) and the upper link piece (7) which allows vertical movement of the saddle within a predetermined range while the saddle is locked in position, and wherein the saddle lifter further comprises a cushion spring (19) which biases the link pieces in a direction to eliminate said play, thereby imparting cushioning properties to the saddle.

* * * * *